Figure 2:
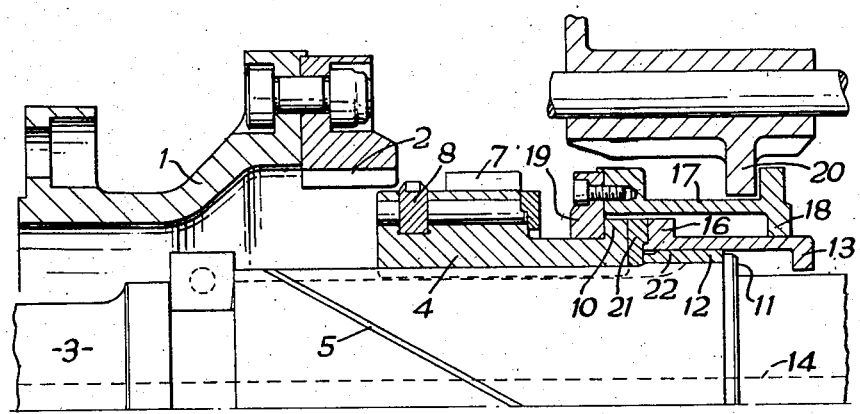

Nov. 17, 1959          P. J. SHORT          2,913,084
CLUTCHES FOR TRANSMITTING ROTARY MOTION
Filed July 24, 1956          3 Sheets-Sheet 1
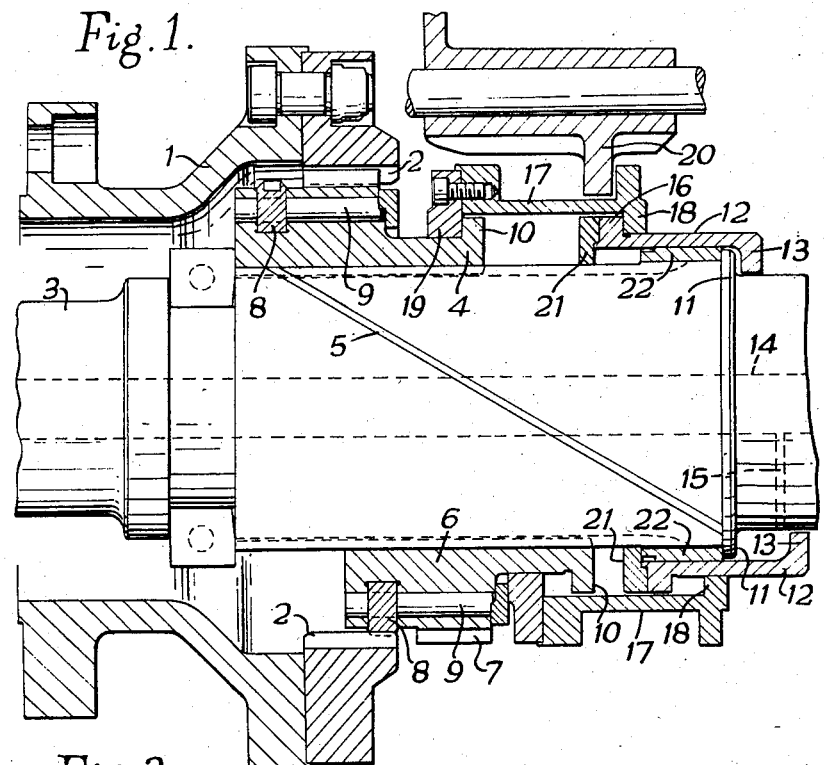
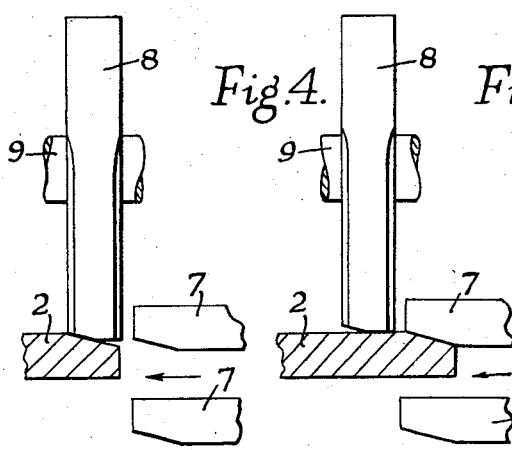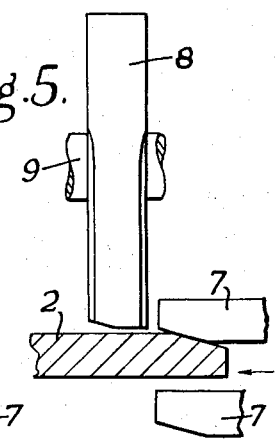
INVENTOR
Philip John Short
BY
Benjamin Sweedler
ATTORNEY Nov. 17, 1959      P. J. SHORT      2,913,084
CLUTCHES FOR TRANSMITTING ROTARY MOTION Filed July 24, 1956      3 Sheets-Sheet 2

INVENTOR
Philip John Short
BY
Benjamin Sweedler
ATTORNEY

Nov. 17, 1959   P. J. SHORT   2,913,084
CLUTCHES FOR TRANSMITTING ROTARY MOTION
Filed July 24, 1956   3 Sheets-Sheet 3
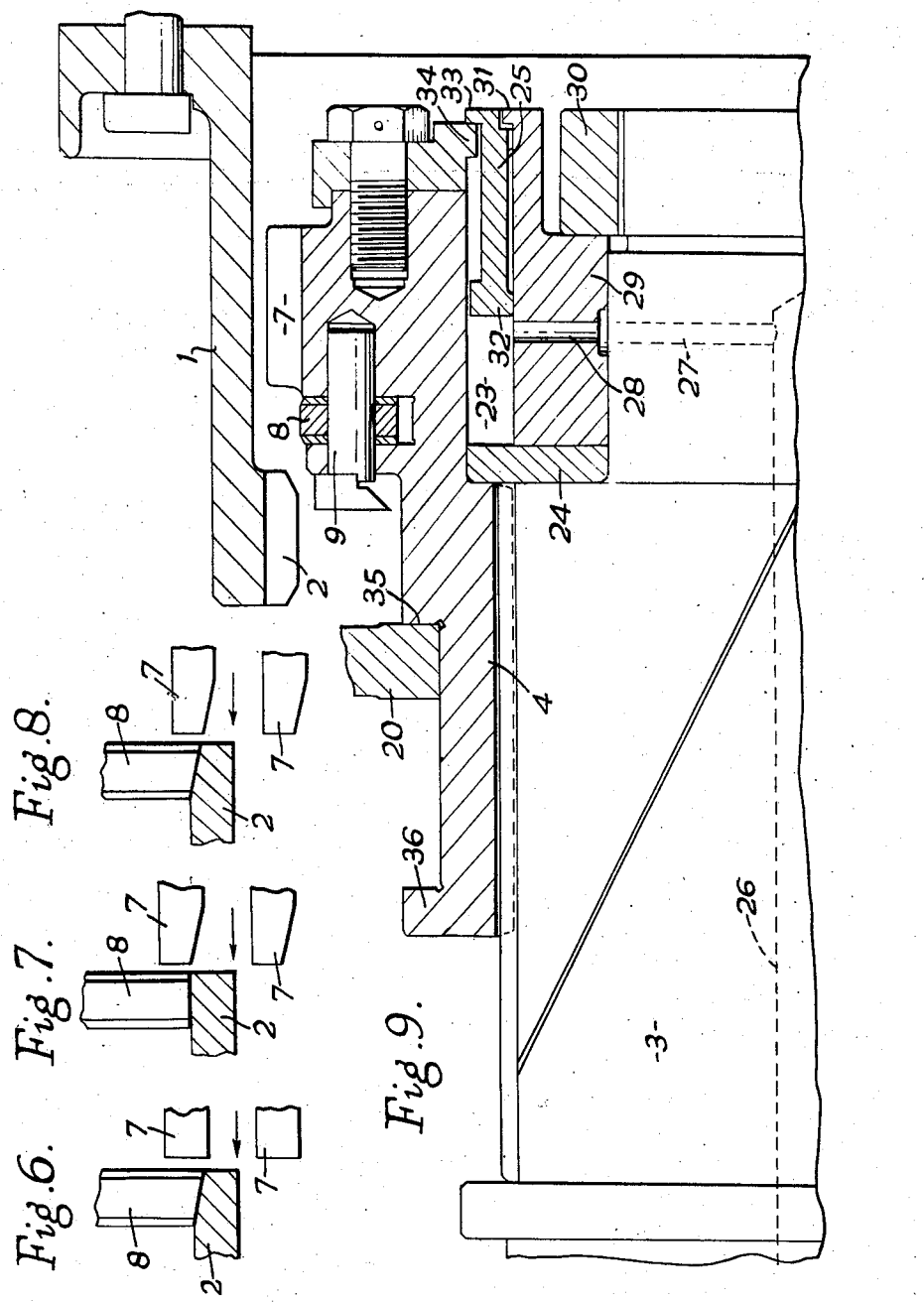
INVENTOR
Philip John Short
BY
Benjamin Sweedler
ATTORNEY United States Patent Office 2,913,084
Patented Nov. 17, 1959

2,913,084

CLUTCHES FOR TRANSMITTING ROTARY MOTION

Philip John Short, Wokingham, England, assignor to S.S.S. Gears Limited, Isleworth, England Application July 24, 1956, Serial No. 599,772

Claims priority, application Great Britain August 3, 1955

8 Claims. (Cl. 192—67)

This invention relates to jaw clutches for self-engagement at synchronism, of the type comprising first and second rotary members, the said first member being provided with jaw clutch teeth, and an intermediate member provided with jaw clutch teeth and constrained for helical movement with respect to the said second member, which is generally a shaft, for bringing the teeth of said intermediate member into and out of engagement with the teeth of the said first member, and comprising means for bringing the teeth of the intermediate member into at least initial engagement with the teeth of the said first member. Such clutches will hereinafter be termed "clutches of the type referred to." The said means may comprise a subsidiary ratchet drive as in clutches of the synchro-self-shifting type having one or more pawls, plungers, or the equivalent (hereinafter referred to as pawls), which are mounted on the said intermediate (or first) member and which under appropriate conditions co-operate with the teeth of the said first (or intermediate) member, by reason of at least one of said pawls being picked up by a projection or tooth, which may be one of the load-bearing teeth of the said first (or intermediate) member, to effect relative helical movement of the said second and intermediate members whereby to bring the teeth of the said first and intermediate members cleanly into engagement.

Synchro-self-shifting clutches of this type are described in United States Patents Nos. 1,862,188 and 2,320,757. In the clutches described in United States Patent 1,862,188 the load-bearing surfaces of the jaw clutch teeth, i.e., the surfaces which are loaded when the clutch is engaged and is transmitting torque, are straight over the whole axial width of the teeth and are parallel to the axis of the clutch. United States Patent 2,320,757 describes a clutch wherein the said surfaces are helical over the whole axial width of the teeth. In each of these prior cases the pawls before they are picked up, project slightly beyond the load-bearing surfaces of the teeth of the member by which they are carried, and when a pawl is picked up by a projection or tooth on the first member it remains in contact with the said teeth or projection until the intermediate member nearly reaches the fully engaged position.

Normally, in the use of clutches of the type referred to above, as little restraint as possible is put on the movement of the intermediate member from its disengaged position to its engaged position and little load is imposed on the pawl which is picked up, i.e., the light load arising from the sliding friction and inertia of the moving member.

In some applications of clutches of the type referred to, it may be required to put some restraint, e.g., in the form of a dash-pot, on the movement of the intermediate member from its disengaged position to its fully engaged position, at least during the latter part of this movement. For example, where a clutch of this type is included in the drive from a gas turbine to a driven member, e.g., for the purpose of disconnecting the gas turbine from the driven member at times to enable the driven member to be driven by an alternative power source, it is desirable to provide the clutch with a dash-pot which is associated with the intermediate member and acts to cushion the movement of the intermediate member as it approaches the position of re-engagement when the drive from the gas turbine is re-established.

The dash-pot may conveniently be formed by an annular space between a shoulder on a shaft constituting the above-mentioned second rotary member and a flange formed on a sleeve surrounding the shaft and coupled to the intermediate member.

If however, the said sleeve is formed as a part of or is rigidly connected to the intermediate member, it is found that prior to engagement of the clutch, and when the shaft and intermediate member are rotating at high speed the action of centrifugal force on the fluid contained in the dash-pot is to produce pressure within the fluid whereby an axial thrust is exerted on the flange in such direction as to oppose the movement of the intermediate member towards the position of the clutch engagement.

Desirably, in the disengaged condition of the type of synchro-self-shifting clutch having a pawl actuated auxiliary ratchet drive the pawls are in a "pawl free" position, i.e., a non-ratcheting position with respect to the first rotary member, and an actuating form is provided for shifting the intermediate member axially, from the pawl-free position to a "pawl-engaged" position, in which the pawls are in a ratcheting position with respect to the first member. In order to produce this axial shift of the intermediate member from the pawl-free to the pawl-engaged position the actuating fork has to overcome the axial thrust caused by the action of centrifugal force on the fluid in the dash-pot, and moreover when synchronism between the first and second members is reached and one or more pawls are picked up by the teeth of the first member, the said pawl or pawls is loaded by the said axial thrust whilst drawing the intermediate member into engagement. The restraint on the actuating fork and the loading of the pawls are both undesirable, and the object of the invention is to provide a clutch of the type referred to in which a dash-pot is provided but in which the disadvantages referred to are avoided.

In accordance with the invention, in a clutch of the type referred to and provided with a dash-pot, a lost motion connection is provided whereby the initial relative engaging movement between the first member and the intermediate member is not materially restrained by the dash-pot, and the dash-pot is effective only during the subsequent part of the engaging movement.

In order that the invention may be clearly understood and readily carried into effect it will now be described in more detail with reference to the accompanying drawings in which Fig. 1 is a view in longitudinal section of a clutch according to the invention, in which pawls are provided for effecting synchronous self-shifting of the clutch into the engaged condition, the upper half of the figure showing the clutch in the fully engaged condition and the lower half of the figure showing the clutch in an initial stage of engagement, Fig. 2 is a view in longitudinal section showing the clutch of Fig. 1 in a pawl-free disengaged condition, Fig. 3 shows an arrangement of the co-operating surfaces of the pawls and clutch teeth, Figs. 4 and 5 illustrating the movement of the clutch towards the engaged position, Figs. 6, 7 and 8 show other arrangements of the co-operating surfaces of the pawls and clutch teeth, and Fig. 9 is a view in longitudinal section of another construction of clutch according to the invention.

Referring to Fig. 1, the first clutch member is a hollow member 1 to which is bolted the ring of internal jaw clutch teeth 2, and the second clutch member is formed by a shaft 3 coaxial with the ring of teeth 2, the intermediate member 4 being constrained to move helically on the shaft 3 by virtue of internal helical splines in the intermediate member 4 engaging with external helical splines 5 on the shaft 3. The intermediate member 4 is provided with an annular flange 6 on which is formed a ring of jaw clutch teeth 7 capable of engaging the internal jaw clutch teeth 2 of the first clutch member 1. On one side of the ring of teeth 7 of the intermediate member 4 are provided a plurality of pawls 8 mounted on pivot pins 9 that project through the flange 6. At the end remote from the pawls 8, the intermediate member 4 is formed with a second annular flange 10. The pawls 8 are arranged with their noses pointing in clockwise direction when viewed from the left-hand end of the clutch in Fig. 1.

The shaft 3 is formed with an annular shoulder 11 and on the shaft 3 is mounted a first sleeve 12 which has an annular inwardly directed flange 13, there being slight clearance between the inner surface of the flange 13 and the part of the shaft 3 that is of reduced diameter due to the provision of the shoulder 11. The annular space between the flange 13 and the shoulder 11 constitutes a dash-pot and is supplied with lubricating oil that is fed via an axial main duct 14 in the shaft 3 and a radial branch duct 15 leading to the said space, the clearance above-mentioned being small so that the said space is kept filled with oil notwithstanding oil leakage via the clearance.

The sleeve 12 is formed with an outwardly projecting annular flange 16, and the clutch is provided with a second sleeve 17 which has at both ends inwardly projecting flanges 18 and 19 which co-operate with the flange 10 on the intermediate member 4 and with the outwardly projecting flange 16 on the sleeve 12 so as to couple the intermediate member 4 to the sleeve 12 with axial lost motion. The sleeve 17 is formed with a groove in which engages an actuating fork 20.

In the arrangement shown in Figs. 3, 4 and 5, the load-bearing surface of each tooth 2 of the first clutch member 1 is chamfered, along the side which is axially nearest to the teeth 7 of the intermediate member 4 at an angle of, say, 6°–12° to the axis of rotation of the clutch, and the end surfaces of the noses of the pawls 8 are chamfered over part of their width at substantially the same angle and in the same direction as the chamfers on the teeth 2. The load-bearing surfaces of the teeth 7 of the intermediate member 4 are similarly chamfered at the edges which first engage the teeth 2 of the first clutch member during a clutch engaging operation. Instead of the noses of the pawls 8 projecting beyond the teeth 7 of the intermediate member 4 (as has hitherto been the invariable practice in clutches constructed in accordance with the above-mentioned Patents Nos. 1,862,188 and 2,320,757), the nose of each pawl 8 may be in line with the set back edge of the chamfered load-bearing surface of a tooth 7 of the intermediate member 4. In this way, when a pawl 8 is engaged by a tooth 2 of the first clutch member 1 (Fig. 2) and the intermediate member 4 is thereby moved helically towards the teeth 2 of the first clutch member 1, the inclined surface of the pawl 8 co-operates with the chamfer on the tooth 2 to guide the associated tooth 7 of the intermediate member 4 during the initial part of the movement in such manner that the chamfered edge of each tooth 7 of the intermediate member 4 is brought on to the chamfered edge of a tooth 2 of the first clutch member 1 (Fig. 3) whereby further movement of the intermediate member 4 in the engaging direction causes the first clutch member 1 to move angularly with respect to the intermediate member 4 so as to move the tooth 2 which engaged the pawl 8 slightly away from the nose of the said pawl 8 (Fig. 4), whereby the said nose and the surface of the tooth 2 engaged by it are relieved from load. When the chamfered edges of the teeth 7 of the intermediate member 4 have passed over the chamfers of the teeth 2 of the first clutch member 1, the teeth 7 of the intermediate member move axially into engagement with the teeth 2.

In another arrangement shown in Fig. 6, the teeth 2 of the first clutch member 1 are chamfered and the surfaces of the pawls 8 are chamfered over their whole width, and are in line with the axially leading edge of the associated teeth 7 of the intermediate member, which are not chamfered but may be slightly rounded at the said edges.

In yet another arrangement shown in Fig. 7, the teeth 7 of the intermediate member 4 are chamfered at the edges nearest to the first clutch member 1. The teeth 2 of the first clutch member 1 are not chamfered but may if desired be slightly rounded at the edges which during the engaging movement are engaged by the chamfered edges of the teeth 7. In this case the end surfaces of the noses of the pawls 8 are not chamfered and may be slightly proud of the corners formed at the junctions of the chamfers and the side surfaces of the teeth 7. When a pawl 8 is picked up by a tooth 2, the initial relative movement of the first and intermediate clutch members 2 and 4 is an axial movement; this is followed by a helical relative movement, i.e., a combined axial and angular movement which relieves the pawl 8 from load, and this movement is followed by an axial relative movement of the teeth 7 of the intermediate member 4 into full engagement with the teeth 2 of the first clutch member 1.

In a still further arrangement shown in Fig. 8 the teeth 2 and the teeth 7 are chamfered and the surfaces of the noses of the pawls 8 are chamfered over their whole width, the relative movement of the first clutch member 1 and the intermediate member 4 when a pawl 8 is picked up by a tooth 2 being first a combined axial and angular movement whereby the pawl 8 is relieved from load, and then an axial movement into the fully engaged condition.

In each of the arrangements shown in Figs. 2 to 7 the chamfers on the teeth 2 and 7 desirably extend over a minor part of the axial width of the said teeth.

Referring again to Figs. 1 and 2, the operation of the clutch is as follows:

In the "pawl free" condition of the clutch (Fig. 2) the sleeve 12 is in a position in which a ring 21 thereon abuts on axial stop 22 on the shaft, and the inwardly projecting flange 13 thereon has its maximum spacing from the shoulder 11, so that the oil space has maximum capacity. The annular flange 10 on the intermediate member 4 abuts the ring 21, the pawls 8 being out of the path of the teeth 2, i.e., to the right of the teeth 2, and the internal flange 18 of the sleeve 17 is axially spaced from the external flange 16 on the sleeve 12. The clutch may be maintained in this "pawl free" condition by suitably setting the actuating fork 20 so that the engagement of the flange 10 by the flange 19 prevents the sleeve 17 and hence the intermediate member 4 from moving axially towards the teeth 2 of the first clutch member 1.

In order to set the clutch so that it is capable of engagement when synchronism is achieved, the actuating fork 20 is moved so as to shift the sleeve 17 towards the first clutch member 1, so that it pushes the intermediate member 4 to an axial position in which the pawls 8 are in ratcheting engagement with the teeth 2. In this condition of the clutch the inwardly projecting flange 18 of the sleeve 17 is still spaced axially from the external flange 16 on the sleeve 12 as shown in the lower half of Fig. 1.

When synchronism is reached a pawl 8 is picked up by a tooth 2, and the intermediate member 4 is drawn axially into toothed engagement with the first clutch member 1. During the initial part of this movement the tooth 2 which picked up the pawl 8 is moved slightly away from the nose of the pawl as described with reference to Figs. 2 to 7 whereby the said nose and the surface of the tooth 2 engaging it are relieved from load. During the initial part of the movement of the intermediate member 4, which takes place rapidly, the spacing of the flange 18 of the sleeve 17 and the external flange 16 on the sleeve 12 is reduced, the lost-motion afforded by said spacing being fully taken up after the nose of the pawl 8 has become relieved from load. The subsequent movement of the intermediate member 4 into the fully engaged position is effected by the interaction of the clutch teeth 2 of the first member 1 and the clutch teeth 7 of the intermediate member 4, and takes place relatively slowly due to the said lost motion having been taken up and the cushioning effect of the dash-pot having come into operation. As the intermediate member 4 moves towards the engaged position, oil is forced through the annular clearance space between the shaft 3 and the internal flange 13 of the sleeve 12, and if desired through small escape holes or graduated orifices (not shown) in the shaft 3 or in the flange 13. In the fully engaged condition of the clutch the pawls 8 have passed axially beyond the teeth 2 of the first clutch member 1 and the internal flange 13 on the sleeve 12 is close to the shoulder 11 on the shaft 3, as shown in the upper part of Fig. 1.

In the embodiment of the invention shown in Fig. 9 the dash-pot is provided by forming in the intermediate member 4 an annular cavity 23 that surrounds the shaft 3, which is provided with a ring 24 that serves as an axial stop for the intermediate member 4 when the latter is in the "pawl free" position shown. An annular piston 25 is disposed in the cavity 23, to which oil is continuously supplied through an axial duct 26 in the shaft 3 and a radial duct 27 in the shaft 3 and a radial duct 28 in a collar 29 which is fixed on the end of shaft 3, being retained by a locking ring 30. The collar 29 has an outwardly projecting flange 31 which prevents movement of the annular piston 25 out of the cavity 23. The piston has external flanges 32 and 33 at its ends, and an internal flange 34 in the intermediate member 4 and projects into the space between the flanges 32 and 33 on the piston 25. The clutch is provided with a control fork 20.

The operation is similar to that of the clutch previously described. During movement of the intermediate member 4 from the "pawl-free" to the engaged position, it slides past the ring 24, and the piston 25 remains stationary until after the pawl 8 that has been picked up by a clutch 2 is relieved from load, at which stage the lost-motion between the flange 34 in the intermediate member 4 and the flange 32 on the piston 25 is fully taken up, and the subsequent engaging movement of the intermediate member 4 is controlled by the dash-pot constituted by the cavity 23 and the piston 25, the piston 25 being moved into the cavity 23 under the action of the internal flange 34 in the intermediate member 4, oil being forced out of the cavity 23 through small escape holes or graduated orifices (not shown) or past the small clearance space between the piston 25 and the radially outer wall of the cavity 23.

In this last described case the operating fork 20 engages a groove in the intermediate member 4, said groove being formed between a shoulder 35 and an annular flange 36 on the intermediate member 4.

The foregoing specific cases relate to auxiliary ratchet drives, as the means for initiating clutch engagement, but the lost motion dash-pot feature of the invention can be applied advantageously to other forms of self engaged synchronising clutches of the type referred to in which other means for initiating clutch engagement are employed and in which it is desired to bring the cushioning effect of the dash-pot into action when the initial engagement has been effected. Whereas the clutches described in the foregoing are provided with an axial stop to limit the travel of the intermediate member when in the fully engaged postion, the lost motion dash-pot invention can also be used with advantage in connection with clutches of the type referred to wherein the axial travel of the intermediate member is limited by a rotational stop when in the fully engaged position. An example of a synchronous self-shifting clutch having a rotational stop is described in United States Patent No. 2,202,271. The last herein described example of a lost motion dash-pot having an annular piston (Fig. 9) can conveniently be applied to a synchronous self-shifting clutch with rotational stop, with or without a controllable sleeve for putting the rotational stop into or out of action.

I claim:

1. In a jaw clutch in combination, a first rotary member provided with jaw clutch teeth, a second rotary member, an intermediate member provided with jaw clutch teeth, means constraining said intermediate member for helical movement with respect to the said second rotary member to bring the jaw clutch teeth of said intermediate member into and out of engagement with the jaw clutch teeth of the said first rotary member, means for bringing the jaw clutch teeth of the intermediate member into at least initial engagement with the jaw clutch teeth of the said first rotary member, a dash-pot means associated with the intermediate member to cushion the movement of the intermediate member as it moves into toothed engagement with the said first rotary member and a lost motion connecting means between the intermediate member and the dash-pot means constructed and arranged so that the initiation of toothed engagement between the intermediate member and the said first rotary member is materially free from restraint by the dash-pot means and said dash-pot means is effective only during the subsequent part of the said relative movement into full toothed engagement of said intermediate member and said first rotary member.

2. A jaw clutch according to claim 1, wherein the second rotary member is a shaft having a part of reduced diameter to form a shoulder, a first sleeve on said shaft having an inwardly directed annular flange which projects towards the reduced diameter part of said shaft, thus forming said dash-pot means between said shoulder and said flange, and a second sleeve coupling said first mentioned sleeve and said intermediate member to provide said lost motion connecting means.

3. A jaw clutch according to claim 1, wherein said second rotary member is a shaft, a cavity provided between said intermediate member and said shaft, a piston movable in said cavity, said cavity and piston forming said dash-pot means, and said lost motion connecting means being disposed between said intermediate member and said piston.

4. A jaw clutch according to claim 1, wherein pawls are provided for initiating toothed engagement of the clutch, said intermediate member is capable of assuming a disengaged pawl-free position, and means for shifting said intermediate member from said pawl-free position to the pawl-ratcheting position without restraint from said dash-pot means.

5. A jaw clutch according to claim 4, having means for relieving the pawls from load subsequent to the initiation of toothed engagement of said intermediate member with said first rotary member.

6. A jaw clutch according to claim 1, wherein said second rotary member is a shaft having a part of reduced diameter to form a shoulder, a first sleeve mounted on said shaft, a radial inwardly directed annular flange which projects towards the reduced diameter part of said shaft, said dash-pot means being formed between said shoulder and said flange, a second sleeve coupling said first mentioned sleeve and said intermediate member to provide said lost motion connecting means, pawls for initiating toothed engagement of the clutch, said intermediate member being capable of assuming a disengaged pawl-free position, and a control fork engaging said control sleeve and operable for shifting said intermediate member from said pawl-free position to a pawl-ratcheting position, said lost motion connecting means permitting said shifting to be effected without restraint from said dash-pot means.

7. A jaw clutch according to claim 1, wherein said second rotary member is a shaft, a cavity provided between said intermediate member and said shaft, a piston movable in said cavity, said piston and cavity forming said dash-pot means, said lost motion connecting means being between said intermediate member and said piston, pawls for initiating toothed engagement of the clutch, said intermediate member being capable of assuming a disengaged pawl-free position, and a control fork engaging said intermediate member and operable for shifting said intermediate member from said pawl-free position to a pawl-ratcheting position, said lost motion connecting means permitting said shifting to be effected without restraint from said dash-pot means.

8. A jaw clutch according to claim 1, wherein pawls are provided for initiating toothed engagement of the clutch, said intermediate member is capable of assuming a disengaged pawl-free position, means for shifting said intermediate member from said pawl-free position to a pawl-ratcheting position without restraint from said dash-pot means, and means for relieving said pawls from load subsequent to the initiation of toothed engagement of said intermediate member with said first rotary member, said dash-pot means being effective to impose restraint on the movement of said intermediate member to its position of full toothed engagement with said first rotary member only subsequent to said pawls being relieved from load.

References Cited in the file of this patent

UNITED STATES PATENTS

| | | |
|---|---|---|
| 2,062,930 | Pritchard | Dec. 1, 1936 |
| 2,258,475 | Sinclair | Oct. 7, 1941 |
| 2,807,343 | Ryder et al. | Sept. 24, 1957 |

FOREIGN PATENTS

| | | |
|---|---|---|
| 523,258 | Great Britain | July 10, 1940 |
| 1,106,955 | France | July 27, 1955 |